United States Patent Office

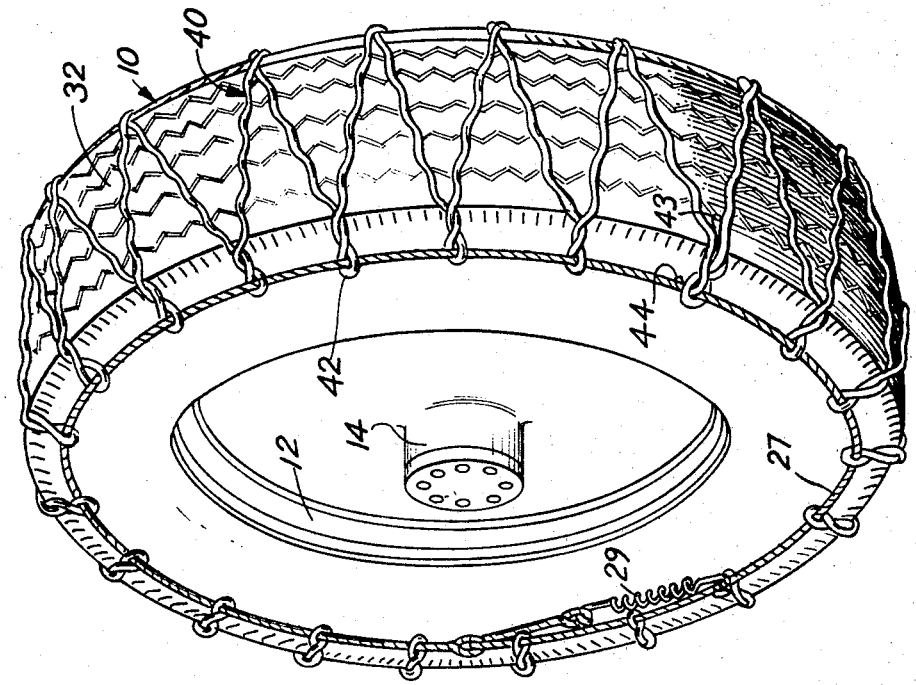
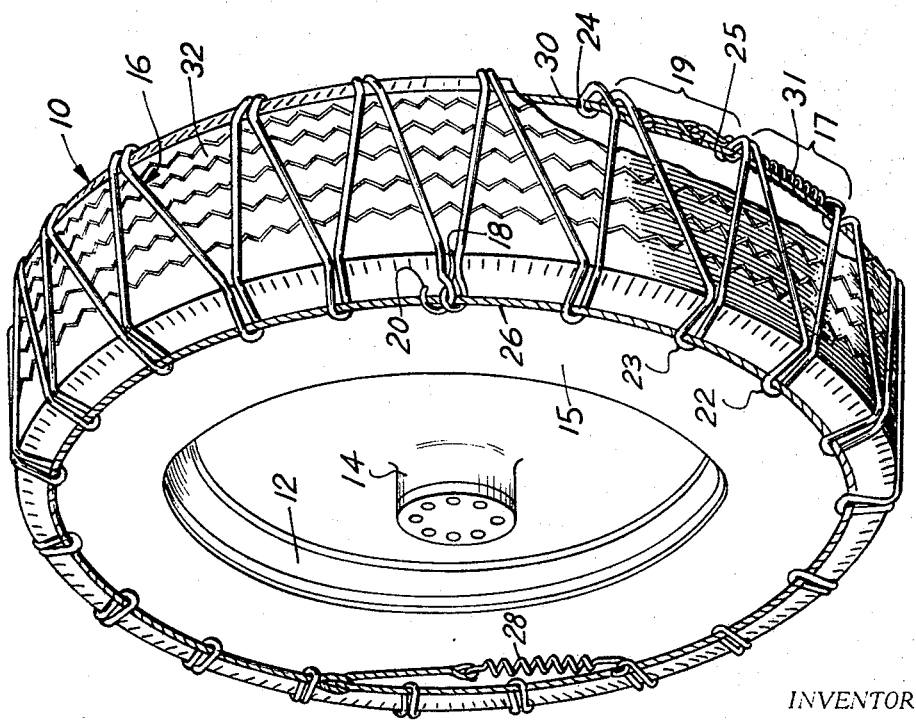

3,476,167
Patented Nov. 4, 1969

3,476,167
WHEEL TRACTION MEANS
George Kitsopoulos, 9139 Commercial Ave.,
Chicago, Ill. 60617
Filed May 19, 1967, Ser. No. 639,697
Int. Cl. B60c *27/12*
U.S. Cl. 152—225      7 Claims

ABSTRACT OF THE DISCLOSURE

Wheel traction means which attach to tires for prevention of skidding both sideways and frontwards. The traction means comprise a single length of wire rod bent in the form of a series of continuous, coplanar zig-zags. The zig-zag wire is fitted against the tire tread to form a closed circular band. The vertex ends of the zig-zags are bent inwardly toward the wheel axis, and a steel cable is threaded through the vertex ends on both sides of the tire tread. The cable is tightened by a spring to hold the traction means tightly against the tread of the wheel.

Background of the invention

This invention relates to a wheel traction means which prevents skidding and slipping on icy or snow-covered streets.

During inclement weather when the streets are snow-clogged or ice-packed, it is common practice to attach chains to vehicle wheels in order to improve traction. These chains may take the form of a single length of chain which is tightened around the vehicle wheel. A number of such lengths may be attached to a wheel to further improve traction. On the other hand, a plurality of parallel segments of chain may be held against the tire tread by a pair of interconnecting chains. Studs provide another means for improving traction. The studs are inegrally moded in the tread of the tire.

These various traction devices have disadvantages. The single chain attached to the wheel does not provide uniform traction around the entire tread. The plurality of chain segments which are all attached to circumferential chains are difficult to tighten around a wheel. Such a chain tends to fly away from the wheel sometimes causing damage to the vehicle. Studs in the tires have been made illegal in many States since tires having studs are normally used during all seasons and tend to damage pavements.

Summary of the invention

In a principal aspect the present invention comprises a sinuously or zig-zag shaped continuous strand of wire rod having its two free ends interconnected so that the wire forms a substantially flat, circular zig-zag band which fits around the tire against the tread. The end loops or vertices of the sinuously shaped wire are bent inwardly toward the axis of the tire and threaded tightly with a cable. The cable is tightened by a tension spring to insure that the wheel traction means is secured against the tire tread.

It is thus an object of the present invention to provide an improved wheel traction means for vehicles which substantially eliminates the disadvantages found in prior wheel traction means.

It is a further object of the present invention to provide an improved wheel traction means which gives substantially continuous traction on a slippery surface.

It is a further object of the present invention to provide an improved wheel traction means which has substantial lateral skid resistance as well as frontward skid resistance.

It is a further object of the present invention to provide an improved wheel traction means which can be secured more firmly against the tread of a wheel.

These and other objects, advantages and features of the present invention will be set forth more comprehensively in the detailed description which follows.

Brief description of the drawing

In the drawings:

FIGURE 1 is a perspective view illustrating a preferred embodiment of the wheel traction means attached to a tire; and FIGURE 2 is a perspective view illustrating and alternative embodiment of the invention.

Description of the preferred embodiments

In FIGURE 1 a preferred embodiment of the invention is shown attached to the rubber tire 10. The tire 10 is mounted on a rim 12 which in turn is mounted on a hub 14 of a wheeled vehicle (not shown). The tire 10 has an inner side wall 13, an outer side wall 15 and a tread 32.

The invention generally comprises a single wire or rod 16 which is bent into the shape of a continuous series of co-planar sinusoids or zig-zags, for example as shown at 17 and 19. The first end 18 and the second end 20 of the wire 16 are interconnectable so that the ends 16 and 18 may be joined to form a continuous closed planar loop. The circumference of the loop is substantially equal to the diameter of the tire 10 about which the loop is placed.

The ends of the zig-zag bends are turned inwardly toward the wheel axis or hub 14 to form eyelets, for example as shown at 22 through 25. A cable 26 is fed through the eyelets as at 22 and 23, on the outer side wall 15 of the tire 10. The cable 26 is drawn tight by means of the biasing spring 28. Similarly, a cable 30 passes through the eyelets, as at 24 and 25, on the inner side wall 13 of the tire 10. The cable 30 is biased by the spring 31. The tightened cables 26 and 30 insure that the traction means is held tightly against the tread 32 of the tire 10. This is true even at higher rotational speeds of the wheel when centrifugal force tends to separate the traction means from the tread. Since the wire 16 passes angularly across the tread 32, it provides traction against skidding both sideways and frontwards. The alternating angular direction of the zig-zag wire 16 further promotes traction by preventing slippage to either side.

FIGURE 2 shows an alternative construction of the wire traction means. The cable tightening means 27 and the tension spring 29 perform identically to the embodiment shown at FIGURE 1. In the second embodiment, however, the wire 40 has a secondary set of bends or waves. In addition, the vertex ends of the zig-zag bends are looped or twisted over to form closed eyelets such as 42. As before, the eyelet ends of the wire 40 are folded toward the center hub 14 and the cable 26 is wound therethrough.

The second alternative construction provides improved traction means since the wavy wire 40 provides more angular surfaces for contact with a slippery surface. The wavy wire embodiment can still be drawn tightly against the tire tread 32 and the tension spring 28 still prevents centrifugal force from separating the traction means from the tread 32.

Wire or rod material which is preferred for such a wheel traction means is well known to those skilled in the art. Preferably a high tensile strength steel rod is used. The rod is resilient and springs into its preformed configuration if distorted by external forces such as those which occur during a quick stop.

The traction means are attached to the tire 10 by fitting the device over the tire and interconnecting or interlocking the free ends (18 and 20 in FIG. 1, 43 and 44 in FIG. 2). The cables (26 and 30 in FIG. 1, 27 in FIG. 2) are then threaded through the eyelets and the spring (28 and 31 in FIG. 1, 29 in FIG. 2) is attached to secure the cables. The traction means may be attached to a wheel without rolling the wheel. This is accomplished by positioning the traction means with the interconnectable ends 16 and 18 at the point of contact between the wheel and the ground. The ends 16 and 18 are then interlocked and the spring biased cables 26 and 30 are attached. The springs, illustrated at 28, will automatically remove any slack in the attachment as the wheel is rotated.

What is claimed is:

1. Wheel traction means which attach to vehicle tires having a tread comprising, in combination:

a single continuous wire having a plurality of continuous, substantially straight, co-planar, equal zig-zag sections, each section being greater in length than the width of said tire tread, said wire having its two free ends interconnectable such that said wire forms a substantially flat, closed circular band which fits around said tire flat against the tire tread, each of said zig-zag sections being joined at a vertex position, each of the vertex positions being bent toward the center of said circular band to form a first and a second set of eyelets positioned on opposite sides of said tire tread, a first and a second cable passing through said first and second set of eyelets respectively, and a first and a second cable biasing means for tightening said first and said second cables respectively such that said wheel traction means are held in a substantially immovable, tight relationship against said tire tread.

2. The combination of claim 1 wherein said wire rod comprises a twisted, wavy wire rod.

3. The device of claim 1 wherein said eyelets are formed by twisting said vertex ends of said zig-zag bends to form closed loop eyelets.

4. An improved wheel traction means for attachment to a wheel having a tread surface, an axis of rotation, an inner side wall and an outer side wall comprising:

a plurality of interconnected substantially straight zig-zag segments, each segment abutting against said tread, and each segment having at least one inner vertex position bent toward said axis against said inner side wall and at least one outer vertex position bent toward said axis against said outer side wall;

a first cable threaded through said inner verticies and tightened by first biasing means; and a second cable threaded through said outer verticies and tightened by second biasing means.

5. The combination of claim 4 wherein said plurality of interconnected segments comprise a single continuous rod.

6. The combination of claim 4 wherein said inner and outer verticies are closed loops.

7. The combination of claim 4 wherein said segments comprise a wavy rod material.

References Cited

UNITED STATES PATENTS

| | | | |
|---|---|---|---|
| 805,528 | 11/1905 | Cantono | 152—208 X |
| 924,806 | 6/1909 | Lyon | 152—225 |
| 1,020,489 | 3/1912 | Gaylor | 152—225 |
| 1,455,408 | 5/1923 | Olson | 152—225 |
| 2,596,248 | 5/1952 | Kennedy | 152—225 |

ARTHUR L. LA POINT, Primary Examiner